United States Patent [19]

Holder et al.

[11] Patent Number: 4,816,015

[45] Date of Patent: Mar. 28, 1989

[54] MACHINE FOR PRODUCING PATTERN CARDBOARD ARTICLES

[76] Inventors: Karl Holder, Holderlinstr. 27, 7318 Lenningen; Walter Ulmer, Hasenbergsteige 30, 7 Stuttgart 1, both of Fed. Rep. of Germany

[21] Appl. No.: 44,371

[22] PCT Filed: Aug. 1, 1986

[86] PCT No.: PCT/DE86/00315

§ 371 Date: Mar. 17, 1987

§ 102(e) Date: Mar. 17, 1987

[87] PCT Pub. No.: WO87/00794

PCT Pub. Date: Feb. 12, 1987

[30] Foreign Application Priority Data

Aug. 1, 1985 [DE] Fed. Rep. of Germany ....... 3527537

[51] Int. Cl.4 .............................. B31B 1/25; B31B 1/02
[52] U.S. Cl. ..................................... 493/355; 493/400; 493/404; 269/21
[58] Field of Search ...................... 493/59, 60, 61, 160, 493/355, 396, 400, 403, 404; 269/21

[56] References Cited

U.S. PATENT DOCUMENTS 2,075,287  3/1937  Jagusch ............................. 493/396
2,679,104  5/1954  Whitton ............................ 493/396
2,996,961  8/1961  Polayes ............................. 493/396
3,294,392  12/1966  Dunham ............................. 269/21
3,308,723  3/1967  Bergh ............................... 493/354
4,544,367  10/1985  Vossen .............................. 493/1

FOREIGN PATENT DOCUMENTS 1151382  4/1985  Canada ............................... 493/400
189909  8/1986  European Pat. Off. .............. 493/59
190331  2/1906  Fed. Rep. of Germany .

Primary Examiner—James G. Smith
Assistant Examiner—William E. Terrell
Attorney, Agent, or Firm—Edwin E. Greigg

[57] ABSTRACT

Machine for producing pattern cardboard articles, in particular folding boxes, having a table board on which a scoring board and/or the workpiece comprising cardboard material are clamped firmly by providing that the table board and the scoring board comprise porous, i.e., air-permeable, but hard material, such as particle board material, and that to effect the firm clamping, a pneumatic negative pressure is generated beneath the table board, and that to produce scoring lines, a scoring tool disposed on a transporting device, so that each point on the workpiece is approachable by the tool. Further tools, specifically a face milling tool for producing the scoring grooves, a marking tool and/or a cutting tool for cutting out the pattern, may also be disposed on the transporting device.

20 Claims, 4 Drawing Sheets

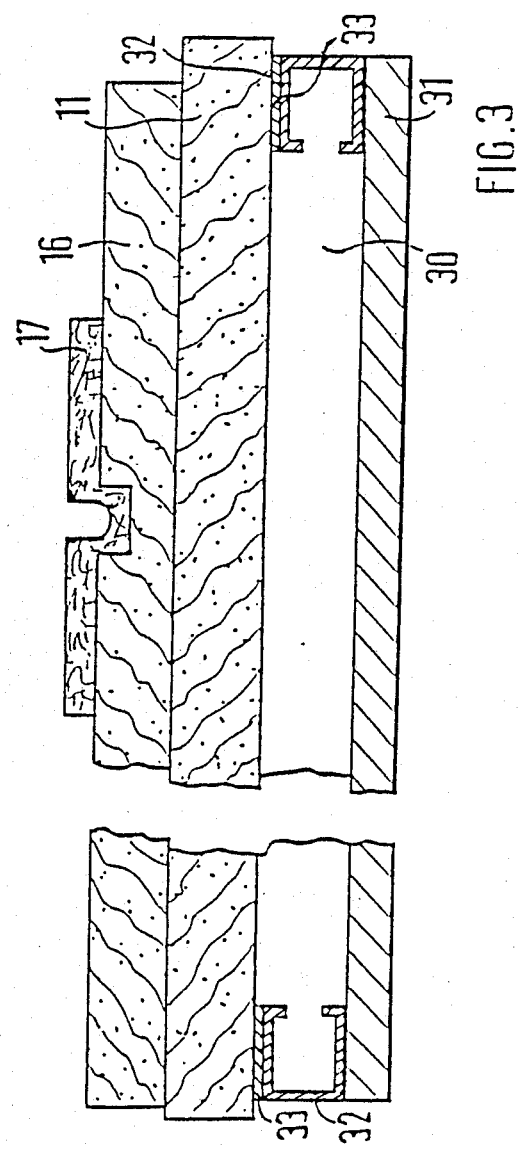

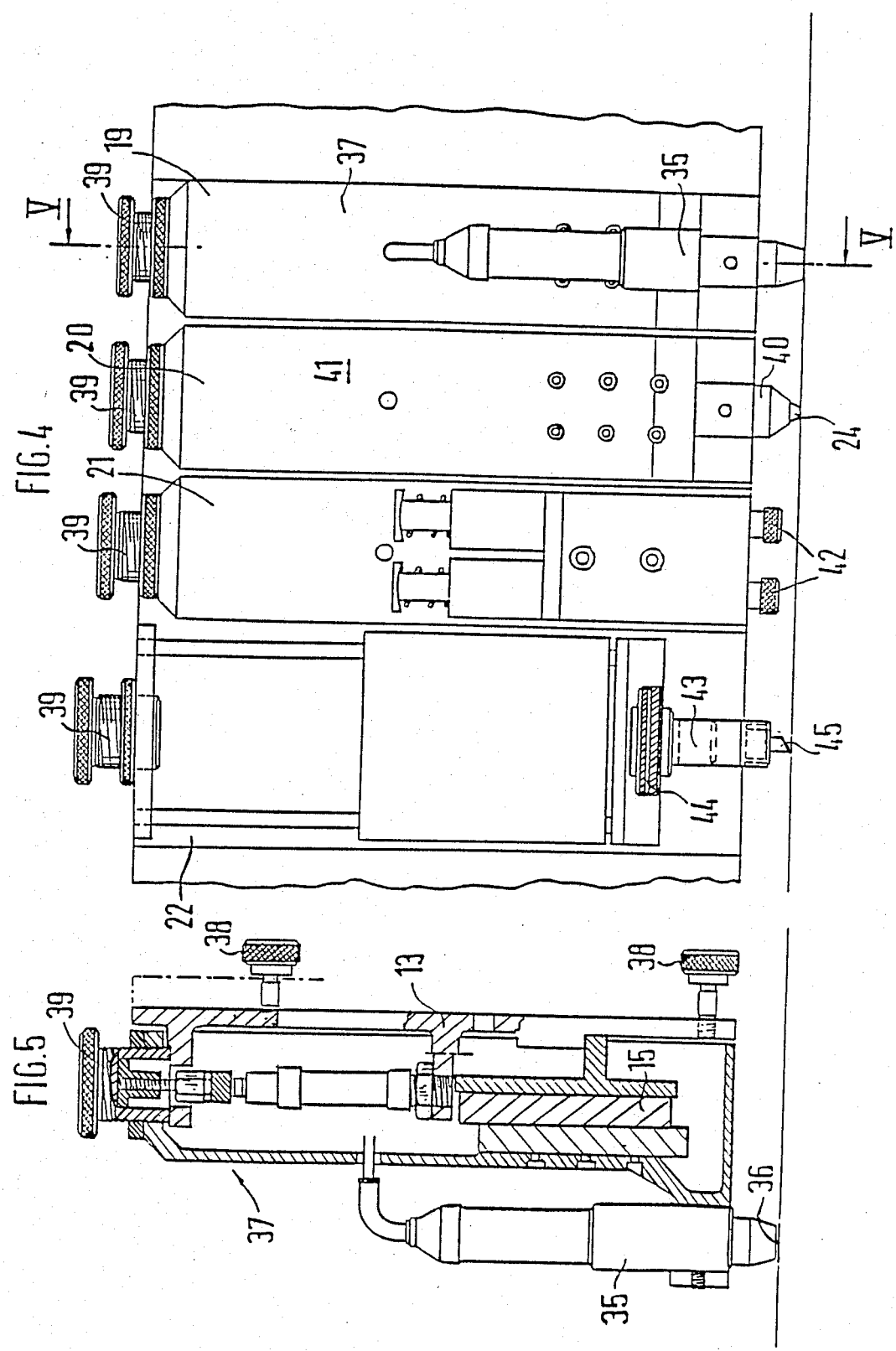

4,816,015

MACHINE FOR PRODUCING PATTERN CARDBOARD ARTICLES

PRIOR ART

The invention is based on a machine for producing pattern cardboard articles.

In a known machine, a scoring wheel which has a relatively large diameter is moved by the guiding device across a workpiece for impressing the scoring line; to make additional scoring lines, or scoring lines extending in a different direction, the workpiece is moved into a corresponding position, while the scoring wheel always follows the same reciprocating path, although in that case the scoring board serving as a backing can be relatively narrow. To enable transporting the workpiece, pneumatically actuated tongs, on the one hand, and an adjuster arm equipped with suction devices for grasping the workpiece, on the other, are provided. The disadvantage of this known machine is that exact positioning of the workpiece for the scoring operation is quite difficult, so a number of measuring transducers which monitor the position of the workpiece at any time must be provided, quite aside from the fact that the entire apparatus is extraordinarily expensive. A substantial disadvantage is that only rectilinear scoring lines can be made, rather than curved ones. Especially in modern cardboard articles, there is an increasing demand for packages with curved fold lines. A further substantial disadvantage of this known machine is that equipping it with numerical control is extremely complicated, if not impossible. Numerical control requires a coordinate system in which set points can be approached, but such a system is difficult to provide because additional coordination must be effected between the transportation of the workpiece and that of the tool; transporting of the workpiece must moreover be effected by two different transporting methods, which also requires one program associated with another one.

In producing ready-cut and scored pattern boxes, it is important that this machine-made and hence reproducible and identical pattern be as similar as possible to the mass-produced product that will later be produced on special stamping and scoring machines; that is, the prerequisites for good machine manufacture must already be apparent and should also already be present in the pattern workpiece. The properties of the packaging material, such as the depth and width of the scoring lines as well as the extent of compression of the material in the vicinity of the scoring line, must already be taken into account in the pattern piece, so that no later than when tests are made with this pattern using the planned subsequent mass production process, the results obtained will deviate little, if at all, from those appropriate for the mass production. Since the force required for folding a box, for example, that is, the prevailing restoring forces, the allowable folding speed, the allowable folding angle, and so forth, depend on the scoring depth and width, it is important that this data already be present in the pattern workpiece. The cardboard that is cut to a pattern and scored on a mass production basis undergoes complex strains in the course of its further processing, which may lead to serious, unforeseeable defects in the product, if there are deviations between the pattern workpiece and the mass-produced workpiece.

Unlike the production of pattern cardboard articles, in the mass production of such folding boxes the scoring is produced via a so-called scoring knife, which has a dull blade that is pressed into the cardboard - so that the cardboard is compressed, but not cut; this scoring knife is disposed in a tool holder and cooperates with scoring grooves in a bottom scoring die. The depth to which the scoring knife penetrates the material is defined exactly, and this corresponds to a defined material compression. Where scoring lines intersect, this can easily be accomplished by means of suitable crossings of the scoring knife or scoring grooves. Naturally, it is much too expensive to manufacture patterns by means of scoring knives, because special tools with suitable scoring knives and scoring grooves (band steel cutter and bottom scoring die) must be devised for every different pattern shape.

The deviation between the pattern folding boxes and the mass-produced folding boxes is even more extreme with other production methods, in which a knife or a spherically ground point is drawn over the workpiece, thereby cutting or pressing into the cardboard, to enable folding the pattern. As a consequence, not only do the physical properties of the pattern cardboard article and of the mass-produced article vary severely, but the material of the pattern is damaged as well.

Another reason why the requirements for physical similarity, above all, between the pattern workpiece and the mass-produced workpiece are becoming more and more stringent is that processing speeds in mass production in the cardboard article industry are constantly increasing, entailing corresponding dynamic stresses on the material, which are more easily tested on a pattern workpiece that is similar to the final article.

ADVANTAGES OF THE INVENTION

The machine according to the invention has the advantage over the prior art that the workpiece can be firmly clamped by the simplest possible means at the desired location and for the entire processing operation, regardless of the size of the workpiece, because although the air flow through the table board is blocked off by the workpiece resting on it, air can flow through the table board in the surrounding areas, with no impairment of the quality of the clamping, as long as the negative pressure is maintained. Naturally it is also conceivable for the workpiece to be firmly clamped to the table board directly, that is, without the intervening scoring board; this may for example be the case if scoring lines are dispensed with, or if these scoring lines are machined directly into the table board. A further substantial advantage is that each point of the workpiece is approachable directly, in two coordinates, by the transporting device, so that relatively simple control devices can be used for triggering the transporting device. The deciding parameters for scoring that largely corresponds to the mass-produced product, namely exact line direction - including curves, for example - the scoring depth and the scoring width, and the indenting forces, are easily attainable by means of the invention. Advantageously, this can be attained in an uncomplicated fashion by using an NC or numerical control, known per se, for the transporting device. The pattern articles can be produced not only more precisely but also more inexpensively and faster than by the known method.

In an advantageous embodiment of the invention, the table board and/or scoring board comprises porous material, in particular a wood material. For clamping flat parts onto a table, it is known to generate a negative pressure on the other side of the table board that pulls these parts firmly by suction, with bores in the table board serving as air openings for transmitting the negative pressure. Such apparatus is known, for example in the packaging industry. In these known machines using this method, the remaining table surface not covered by the part that is to be firmly clamped is relatively small, and so the air loss through the bores that are not covered is still acceptable. In the machine according to the invention, however, the table surface must be suitable for the largest possible pattern cardboard, so that in most cases, only a relatively small portion of the table surface is covered. Here, a board that is air-permeable solely through its porosity is particularly advantageous, because the sum of the orifice cross sections of the pores on the surface of the board, which is solely definitive of the suction force, is large; meanwhile, because of the non-rectilinear course of the pores through the board, a pronounced throttling effect is present.

If the scoring board is also made from such a porous material, then the negative pressure is transmitted from the surface of the table board through the scoring board to the workpiece. Here again, the aforementioned advantages pertain for optimizing the suction force. Moreover, because porous material is used the table board and the scoring board can be designed freely, while contrarily, with conventional bores in the table board and scoring board, the bores must first be made to coincide for transmitting the negative pressure, and there must also be additional bores present in the table board, which would firmly hold the scoring board on the table board.

In one embodiment of the invention, a material can be used as the porous or wood fiber material such as is used in wood fiber boards, in particular in particle boards. Boards of this kind are advantageously obtainable at favorable cost, so that one scoring plate can be prepared per se or each pattern, and such a plate can also be used on both sides. Scoring grooves already present in a board and located facing the table board have only negligible influence on the clamping quality. Moreover, scoring grooves for a plurality of independent patterns can be disposed on one side, so that a scoring board of this kind can cover the entire table board. Here the invention overcomes a prejudice held by those skilled in the art, according to which particle boards are still considered to be non-porous or only insufficiently air-permeable. Advantageously, not only is the costly provision of bores that admit air dispensed with, but because of the more pronounced throttling action of such a material, which admits correspondingly less air, there is a savings of the energy generating the negative pressure. This use of a porous material according to the invention for firmly clamping material that is largely impermeable to air or that at least throttles the passage of air, and in particular the use of wood materials such as particle board material, is not limited to the generic machine for producing pattern cardboard articles; instead, it can also be used in mass production of cardboard articles or in other fields such as foil and paper processing, so that an advantage extending to these fields as well is also attained.

According to a further embodiment of the invention, not only a scoring tool but also a face milling device for producing scoring grooves, and/or a marking device for drawing the tool pattern, and/or a cutting tool for cutting out the pattern are present on the tool carriage, via tool holders that are preferable independently triggerable. This has advantages particularly for programmed triggering, for example by means of the embodiment according to the invention; that is, the table board and the transporting device are part of a numerically controlled compound table, with the tool carriage embodied as a compound carriage. While the tools can approach any point in accordance with a predetermined coordinate system by means of the tool carriage and the guidance device disposed on it, any tool can be put to use independently of another by means of a lifting device for each individual tool holder.

According to another embodiment of the invention, at least the cutting tool and/or the scoring tool are rotatable in a program-controlled manner about the axis extending vertically relative to the plane of the table and located in the direction of insertion and retraction. This advantage is particularly effective if the scoring tool is flat and has a longitudinal extension into a scoring line, so that because of this rotatability this longitudinal extension is adjustable in the direction of the scoring groove. This is always important whenever the scoring lines do not extend rectilinearly. The tool is thus guided in its longitudinal extension at a tangent to the curvature of the scoring line.

In a further embodiment of the invention, the scoring tool has a scoring wheel.

According to still another embodiment of the invention, a scoring runner serves as the scoring tool. The scoring wheel and the scoring runner have a cross section adapted to the scoring line.

In particular in pattern production from corrugated cardboard, the scoring runner proves to be advantageous because of the slower deformation or compression of the material, which considerably lessens the danger of damage to the surface.

According to another embodiment of the invention, an oscillatingly driven hammer that effects the compression can be used as the scoring tool; it produces the scoring by placing in contact with one another the indentations produced by its working surface upon compression of the material. The working surface of the hammer is preferably centrally symmetrical and curved. The impact drive of the hammer is effected vertically to the workpiece surface while the hammer is being displaced along the intended scoring line. With this tool, even narrow radii of a scoring line can advantageously be traced without any problem at all. The change in shape of the workpiece, for instance warping of the surface of the processing cardboard, is largely equivalent to mass production, even with a scoring knife in which compression is performed only vertically. Depending on how the working surface of the hammer is embodied, the scoring lines can thus suit the indended manufacture. That is, they may be soft, or they may have various widths, for instance after tool inserts have been replaced. The scoring hammer can also, in accordance with the invention, execute its own motion, preferably a circular motion, about its reciprocating axis, which makes the scoring line wider depending on the extent of the motion.

According to the invention, all the tools can be provided with a pneumatic drive, since the use of air as a working medium is often possible using already existing air pressure or negative pressure generators. With air as the working medium, a highly resilient (compressible) medium is available, which when used prevents damage to the tool or material in the event of sudden resistance. Also, pneumatic equipment belongs to a field of technology in which malfunctioning is relatively unlikely. Naturally, instead of a pneumatic drive, a drive can be effected by some other known means, such as hydraulic means, magnetic means or electrical means such as ultrasound. The definitive factor is that the tool is controllable for use by such means. For instance, it is naturally also possible for an apparatus that uses laser beams to be used as the cutting tool or as the tool for producing the scoring grooves.

Further advantages and advantageous embodiments of the invention will become apparent from the ensuing description, drawings and claims.

DRAWING

An exemplary embodiment of the subject of the invention is shown in several variants in the drawing and will be described in further detail below.

FIG. 3 illustrates a section taken through the table board, scoring board and workpiece;

FIG. 4 illustrates a view of the tools of FIG. 1, with a scoring hammer as the scoring tool;

FIG. 5 illustrates a section taken along the line V—V of FIG. 4;

DESCRIPTION OF THE EXEMPLARY EMBODIMENT

Figure 1:
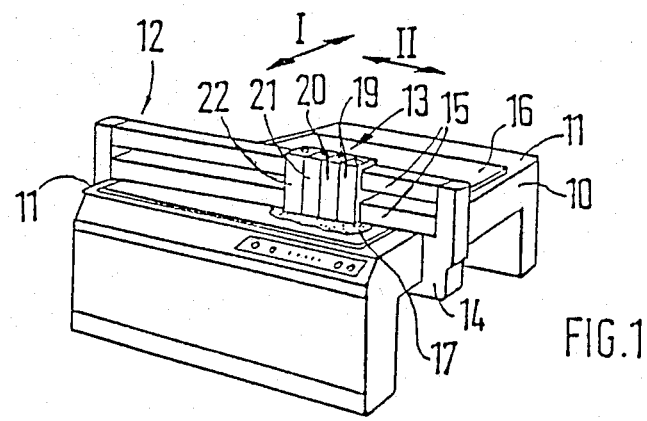
FIG. 1 illustrates a machine according to the invention for producing pattern cardboard articles, seen in a perspective view, while the other drawings show details of FIG. 1 on a larger scale, in some cases in variant forms.

In FIG. 1, a machine according to the invention for producing pattern cardboard articles is shown in a perspective view. This machine has a work table 10 having a table board 11, across which a tool carriage 12, as the transporting device, is displaceable; the tool carriage has tools disposed on it on tool holders 13. The tool carriage 12 has vertical retainers 14 guided on the table 10, which are connected to one another by guide bars 15, on which the tool holders 13 are displaceable. Thus the tools can be adjusted the full extent of the workpiece in one direction of the table board via the tool carriage 12, and in the other direction via the tool holders 13; for the first adjustment direction I, the tool carriage 12 or the vertical retainers 14 are guided along the table 10, and for the second displacement direction II the tool holders 13 are displaceable on the guide bars 15. In this way, every point on the table board 11 can be approached. A scoring board 16 is fastened to the table board 11, and the workpiece 17 for producing the pattern is secured to the scoring board 16. The tools shown here, solely by way of example, are a face milling tool 19, a scoring tool 20, a marker for two colors 21 and a cutting tool 22.

This machine shown in FIG. 1 functions as follows: The set-point data of the intended cardboard pattern are fed into a computer (not shown), so that they can then be drawn on the scoring groove board 16 by the marker 21, which is driven via the transporting device comprising the tool carriage 12 and tool holders 13. The scoring groove board 16 is firmly clamped on the table board 11, as will be described in further detail below, by means of a negative pressure generated beneath the table board 11 and transmitted through it to the scoring groove board. After the marking, the scoring grooves are milled into the scoring groove board 16 in accordance with the intended scoring lines by the face milling tool 19, driven in the same way as the marker 21. After that, the cardboard-like workpiece 17 is placed upon the scoring groove board 16 and then likewise firmly clamped by means of the negative pressure.

The scoring lines are then impressed into this workpiece 17 by the scoring tool 20, in particular by indentation into the scoring grooves; after that, the cardboard box pattern is cut out by the cutting tool 22. Naturally, the cutting operation can be performed prior to the scoring instead.

Figure 2:
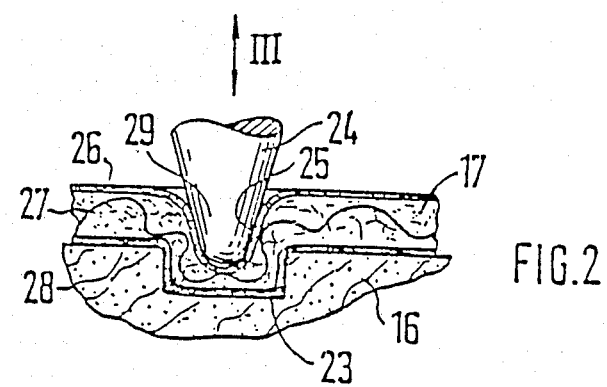
FIG. 2 illustrates a section through the scoring board and workpiece in the vicinity of a scoring groove with the tool inserted.

FIG. 2 shows a detail relating to the scoring, on a larger scale. A scoring groove 23 shown in cross section is present in the scoring groove board 16, and a scoring line 25 is made in this groove 23 through a workpiece 17 by a scoring tool 20 (not shown in further detail) embodied by a hammer 24. As the workpiece 17 in this case, cardboard box is shown here as an example, having an upper layer 26, a corrugated inside web 27 and a lower layer 28. Naturally, a solid cardboard can be used instead. By means of the hammer 24, the workpiece 17 is compressed in the vicinity of the scoring groove 23 in such a way as to produce a depression, and by disposing such compressions next to one another the scoring line 25 is produced along the scoring groove 23. The hammer 24 is moved back and forth as indicated by the double arrow III, and during this oscillating motion the aforementioned displacement of the scoring tool 20 takes place. The movement along the double arrow III is vertical to the planar extension of the scoring groove board 16 or of the workpiece 17. For the sake of gentle handling of the upper layer 16 of the workpiece 17, in a manner similar to the scoring knife, the working face 29 of the hammer 24 that comes into contact with the workpiece 17 is embodied frustoconically, with rounded edges.

The hammer 24 may be driven in various ways. Preferably, this is done in such a way that the oscillation frequency of the hammer 24 is adjustable. In any case, however, the penetration depth of the hammer 24 into the workpiece 17 is adjustable via the stroke of the hammer.

In FIG. 3, the clamping of the scoring groove board 16 and workpiece 17 to the table board 11 is explained. Underneath the table board 11 is a negative pressure chamber 30, which is defined at the top by an airtight board 31 and at both sides by U-shaped rails 32 open toward the negative pressure chamber 30. The U-shaped rails 32 are secured tightly on the board 31 and serve to direct negative pressure to the negative pressure chamber 30. The negative pressure is generated by a vacuum pump, not shown. Between the two U-shaped rails 32 and the table board 11, a sealing tape 33 is provided.

According to the invention, the table board 11 comprises a porous, air-permeable material, for instance an air-permeable wood material such as that used in particle board. The scoring groove board 16 here is made of similar material. When negative pressure is generated in the negative pressure chamber 30, air is now aspirated into the negative pressure chamber 30 through the boards 11 and 16. Because of the very fine porosity and only slight air permeability of the boards 11 and 16, only relatively little air passes through the plates, so that the cost of maintaining the negative pressure in the chamber 30 is also relatively low. The scoring groove board 16 may naturally be much smaller than the table board 11 without thereby reducing the suction and hence the clamping of the scoring groove board 16 to the table board 11 effected by the negative pressure, as long as the negative pressure is maintained. On the covered area of the table board 11, the passage of air is in fact reduced because of the covering, even though this covering is air-permeable, and the consequence is the suction that is brought about for clamping purposes. This suction is naturally also produced for the workpiece 17 resting on the boards 11 and 16 so as to clamp it as well, and naturally the suction is reinforced if the workpiece 17 comprises airtight material.

In FIGS. 4 and 5, the tools 19-22 are shown on a larger scale. The face milling tool 19, which is also shown in longitudinal section in FIG. 5, has an electrically driven milling head 35, in which a milling cutter 36, not shown in further detail, is driven for its rotational movement. The milling head 35 is carried by a barrel 37, which is disposed laterally displaceably on the guide bar 15 and is adjustable in its vertical position via adjusting screws 38 and in its height by means of an adjusting screw 39.

The scoring tool 20 is shown here only in projection by way of example, and in its lower portion it has a pneumatically driven tool bearer 40 for receiving the hammer 24; the tool bearer has a pneumatic drive, known per se and including a working cylinder and the like, and is supported in a barrel 41, which is supported and actuated in the same manner as the barrel 37 of the face milling tool 19. The marker 21 disposed beside the scoring tool 20 functions in a known manner using marking pens 42, each containing ink of different colors that are controlled and moved on demand. Otherwise, in terms of its positioning and guidance, the function of this tool is similar to that of the face-milling tool 19. The cutting tool 22 is also shown only in projection, and like the other tools it has an adjusting screw 39 for adjusting its height. The knife holder 43 may additionally be adjusted in height with an adjusting screw 44. The knife 45 can be changed in a known manner.

Figure 7:
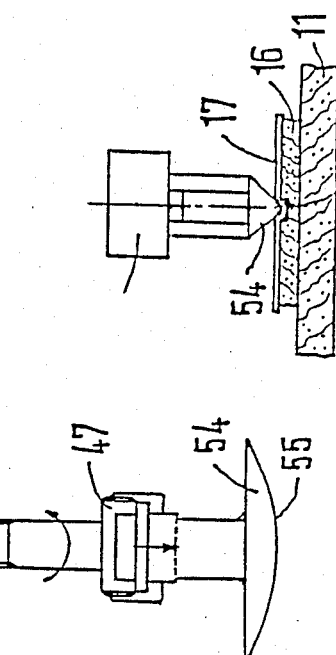
FIGS. 6 and 7 illustrate a scoring wheel as a variant scoring tool.
Figure 6:
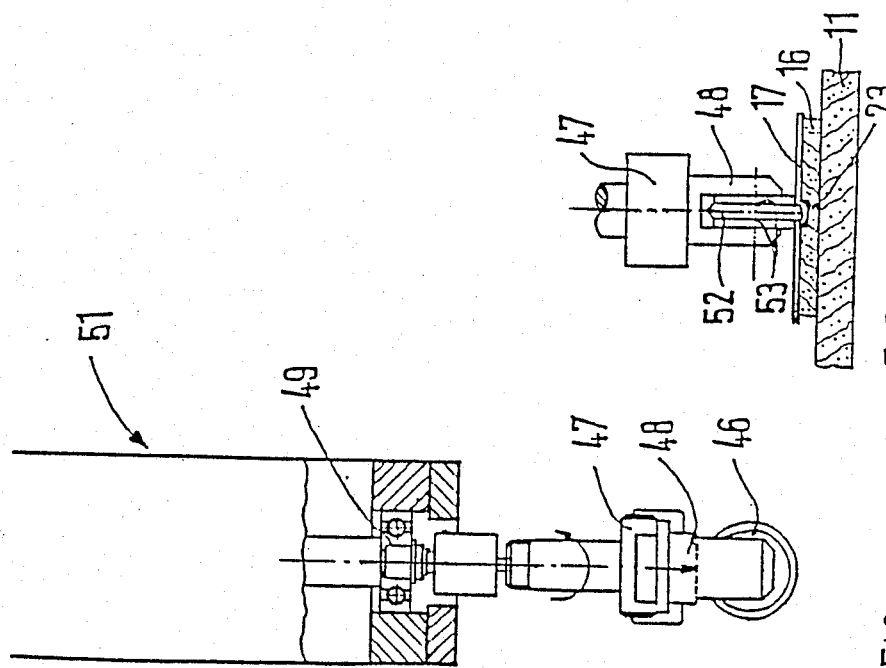

In FIGS. 6 and 7, a first variant of the scoring tool is shown, namely a scoring wheel 46, known per se, instead of a hammer. This scoring wheel is disposed via a fork 48 on a tool bearer 47, which is rotatable via a bearing 49 in the barrel 51 of the tool holder 13. As a result, the travel direction of the scoring wheel 46 can be adjusted such that it is adaptable at a tangent to any curved scoring lines that may be provided; naturally, the already existing scoring grooves correspond in their course to that of the intended scoring line. In addition to this ability for rotation inside the barrel 51, the scoring wheel is also capable of being adjusted in the reciprocating direction by means not shown, so that it can reach the engagement position in the same way as the other tools, for example the face milling tool.

The scoring wheel 46 has an annular bead 52, with which the workpiece material is compressed into the scoring groove 23, and it also has tracks 53 located on both sides of this annular bead 52, which serve as additional means of plane support of the scoring wheel 46 with respect to the workpiece 17 or the scoring groove board 16.

Figure 9:
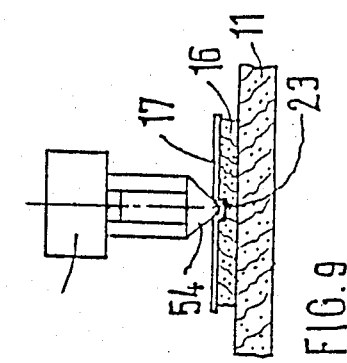
FIGS. 8 and 9 illustrate a scoring runner as a variant scoring tool.
Figure 8:
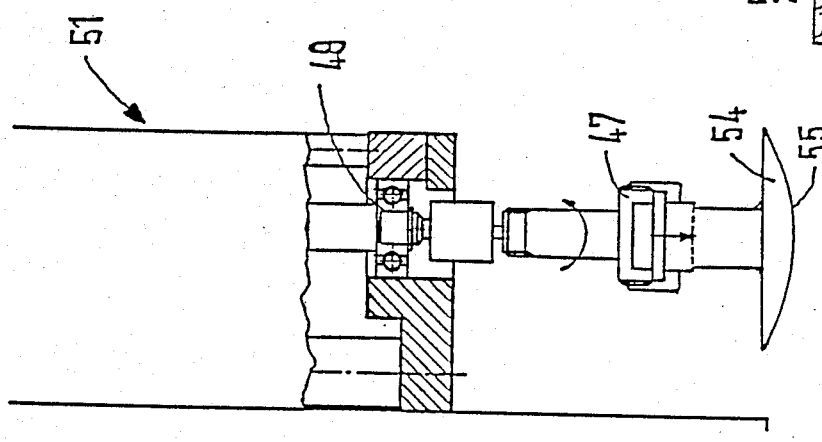

A second variant of the scoring tool, namely a scoring runner, is shown in FIGS. 8 and 9. In a change from the first variant, instead of a scoring wheel, a scoring runner 54 is provided on the tool bearer 47, which compresses material and forms scoring lines by sliding over the workpiece 17, specifically along the scoring groove 23. The scoring runner 54 has a conical cross section, which toward the workpiece 17 tapers into a curved path 55. In this variant as well, the scoring runner 54 can be adapted tangentially in its longitudinal extension to the course of the scoring groove and thus of the intended scoring line by being rotated.

All the characteristics disclosed in the description, the ensuing claims and in the drawing may be essential to the invention either individually or in any arbitrary combination with one another.

We claim:

1. A machine for producing pattern cardboard articles, in particular folding boxes which comprises
    a table board (11) on which a scoring board (16) and/or a workpiece (17) of cardboard material can be clamped,
    said table board having a substantially continuous top surface for firmly clamping said workpiece thereto,
    a scoring tool (19-22, 46, 54) for impressing scoring lines (25) into said workpiece,
    a tool carriage (12, 13) for transporting and positioning the scoring tool (19, 20, 46, 54) relative to said workpiece,
    said tool carriage including a guide device (13) for rectilinear displacement of said scoring tool during impressing scoring lines into said workpiece,
    a pneumatic negative pressure clamping means for clamping said workpiece (17) to said table board,
    said pneumatic negative pressure clamping means being below said table board (11) said table board being formed from an inherently porous material such that for acting upon said scoring board (16) and/or said workpiece (17) are firmly clamped form underneath by a pneumatic negative pressure acting through the table board by virtue of the inherent porosity of the material, and
    said tool carriage (12) includes a guide device (15) which supports at least one tool holder (13), and
    said tool carriage is movable transversely to the direction of displacement of said at least one tool holder, so that every point on the workpiece (17) can be approached.

2. A machine, in particular as defined by claim 1, in which said wood porous material comprises a wood material.

3. A machine as defined by claim 2, in which the porous material is a particle board.

4. A machine as defined by claim 1, in which said pneumatic negative pressure clamping means underneath the table board (11) is formed by a closed negative pressure chamber (30) which extends virtually across the entire dimensions of the table board.

5. A machine as defined by claim 1, which includes a plurality of tool holders (13), one each of said tool holders may include a scoring tool (54), a face milling tool (19) for producing scoring grooves (23) in the scoring groove board (16), a marking device (21) for representing the workpiece pattern and a cutting tool (22) for cutting out the pattern a cutting tool (22) for cutting out the pattern.

6. A machine as defined by claim 5, in which said table board (11) and said tool carriage and said tool holders are parts of a numerically controlled compound machine.

7. A machine as defined by claim 5, in which at least said cutting tool (22) and said scoring tool are rotatable about an axis extending vertically with respect to the plane of the table in a vertical direction of insertion and retraction of said tools.

8. A machine as defined by claim 6, in which at least said cutting tool (22) and said scoring tool are rotatable about an axis extending vertically with respect to the plane of the table in a vertical direction of insertion and retraction of said tools.

9. A machine as defined by claim 1, in which scoring lines (25) a reproduced by compression of the workpiece cardboard material.

10. A machine as defined by claim 9, in which the scoring tool (20, 40) includes a hammer (24) driven in oscillation and effecting the compression, which generates the scoring line by disposing beside one another indentations made by a working face (29) upon compressing the cardboard material.

11. A machine as defined by claim 10, in which the working face (29) of the hammer (24) is curved and centrally symmetrical.

12. A machine as defined by claim 10, in which said hammer (24) is movable vertically with respect to the workpiece surface (17) for a hammering drive (3), while said transporting device (20, 40, 41) is movable along an intended scoring line (25).

13. A machine as defined by claim 11, in which said hammer (24) is movable vertically with respect to the workpiece surface (17) for a hammering drive (3), while said transporting device (20, 40, 41) is movable along an intended scoring line (25).

14. A machine as defined by claim 10, in which said hammer (24), in addition to its vertical movement, also executes an independent circular movement about its axis.

15. A machine as defined by claim 1, in which said scoring tool has an indenting scoring bead (52) of conical cross section.

16. A machine as defined by claim 1, in which a scoring runner (54) serves as the scoring tool.

17. A machine as defined by claim 16, in which said scoring runner (54) has a cross section tapering a conical fashion toward its bottom.

18. A machine as defined by claim 16, in which said scoring runner (54) has a curved path (55).

19. A machine as defined by claim 16, in which said scoring runner (54) is embodied as a circular segment.

20. A machine as defined by claim 17, in which said scoring runner (54) is embodied as a circular segment.

* * * * *